United States Patent

[11] 3,631,861

[72] Inventor Fred J. Skahill
 Davenport, Iowa
[21] Appl. No. 16,120
[22] Filed Mar. 3, 1970
[45] Patented Jan. 4, 1972
[73] Assignee J. I. Case Company
 Racine, Wis.

[54] CORN THRESHING CYLINDER AND CONCAVE
 3 Claims, 4 Drawing Figs.
[52] U.S. Cl. .................................................. 130/6,
 130/8
[51] Int. Cl. ...................................................... A01f 11/06
[50] Field of Search ............................................ 130/6, 8, 27
 HA

[56] References Cited
 UNITED STATES PATENTS
 204,161 5/1878 Miller .......................... 130/8
 2,954,657 10/1960 Poole et al. ................... 130/6
 2,931,362 4/1960 Carlson ........................ 130/6

Primary Examiner—Antonio F. Guida
Attorney—Cullen, Settle, Sloman and Cantor

ABSTRACT: An agricultural combine for shelling corn comprises a cylinder with helical ridges and a concave having guide ribs perpendicular to the axis of the cylinder. The helical ridges impart both a longitudinal translation and an axial spin to the ears of corn, and the guide ribs cause the ears to be aligned parallel therewith. The alignment of the ear results in the corn being shelled by the abrasion of one ear against another, thus reducing the cracking of the kernels while increasing the vigor of the shelling action.

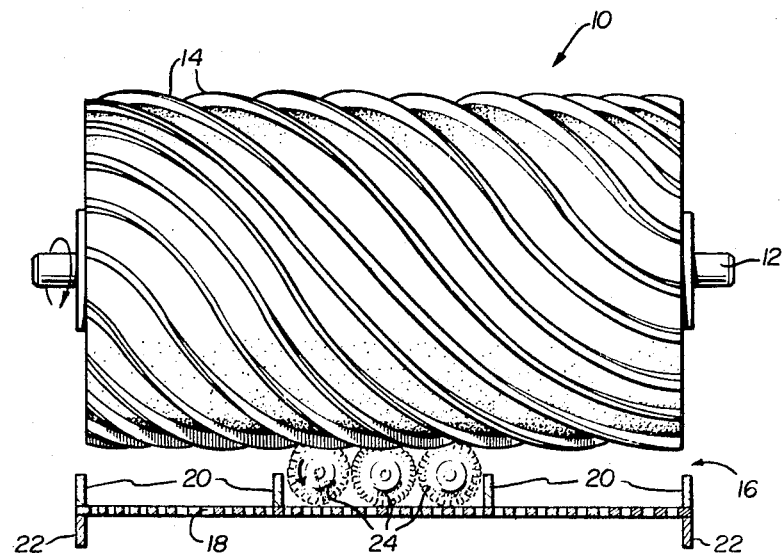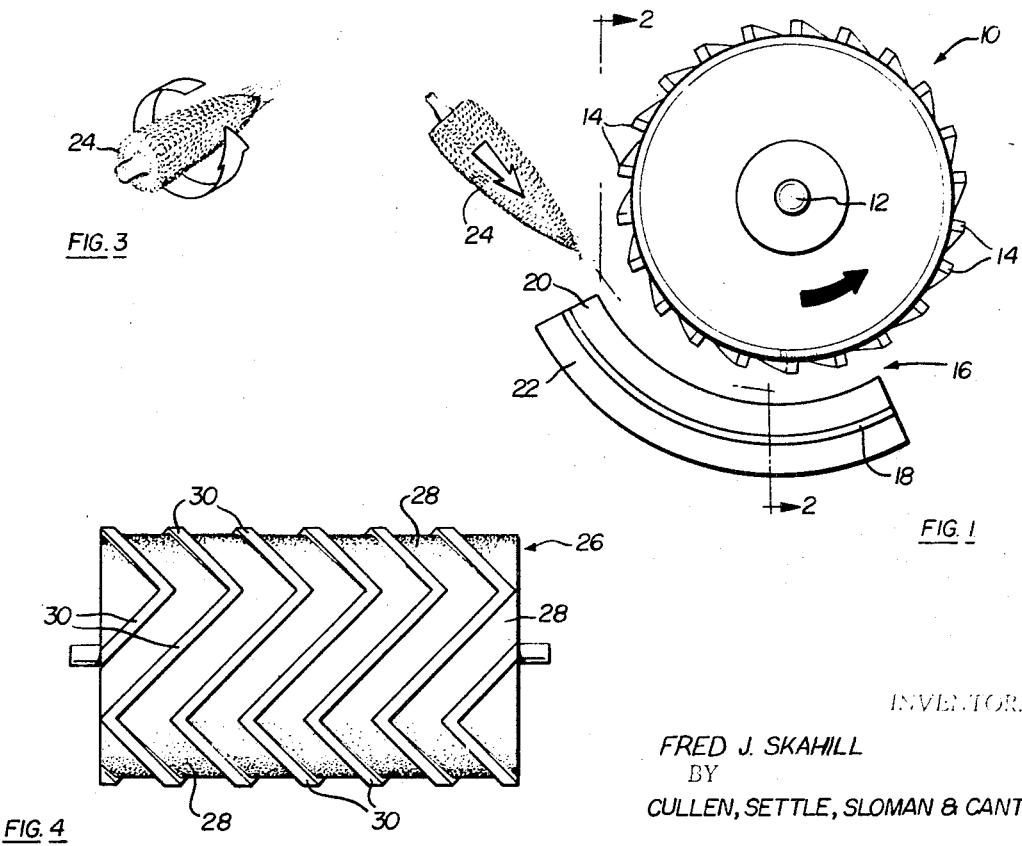

CORN THRESHING CYLINDER AND CONCAVE

BRIEF DESCRIPTION OF THE DRAWINGS

FIG. 1 is an end view of the cylinder and concave of this invention.

FIG. 2 is a front view of the cylinder of FIG. 1, further illustrating the concave in section, viewed in the direction of arrows 2—2.

FIG. 3 is a view of a typical ear of corn showing the double motion imparted thereto by the combine of this invention.

FIG. 4 is a view similar to FIG. 2 but showing a modified form of cylinder.

DETAILED DESCRIPTION OF THE DISCLOSURE

FIGS. 1 and 2 of the drawings illustrate the unique cylinder and concave portion of a combine which is especially adapted for use in shelling corn. Cylinder 10 is mounted for rotation in the combine on shaft 12 which is oriented horizontally and transversely to the direction of feed of the crop into the combine.

A series of parallel helically arranged bars or ridges 14 are secured to the circumference of cylinder 10. By way of example, the cylinder may be approximately 28 inches long and 15 inches in diameter, with approximately 30–40 ridges mounted thereon at about a 45° spiral angle. The ridges may be about three-eighths of an inch square in cross section. With these dimensions, the preferred speed of the cylinder is about 400 r.p.m.

Immediately beneath cylinder 10 is concave 16, which comprise a conventionally perforated floor 18 and a series of parallel vertical guide ribs 20 oriented perpendicularly to the axis of cylinder 10. The spacing between adjacent guide ribs 20 is preferably selected to just accommodate a predetermined number of parallel and tangentially contacting ears of corn, for a purpose to be more fully understood below. The illustrated spacing accommodates three ears. A pair of concave supports 22 are fixed to the respective side edges of the concave.

The radial gap between the outer edge of ridges 14 and the floor 18 of concave 16 preferably decreases as the ears travel through the combine from left to right as viewed in FIG. 1, with the gap ultimately narrowing to less than the diameter of a typical ear.

In operation, the ears of corn are fed into the left side of the combine of FIG. 1 by a conventional feed apparatus (not illustrated), with the axes of the ears substantially parallel to each other and prealigned with guide ribs 20. The ridges 14 of rotating cylinder 10 contact ears 24 and propel them forwardly through the gap between the cylinder and concave. Guide ribs 20 on concave 16 maintain the orientation of the ears substantially parallel to each other and to the direction of motion of the ears through the concave, and also keep the ears from being swept to one end of the cylinder by spiral ridges 14.

The uniqueness of this corn-shelling combine is found in the helical arrangement of ridges 14 on the cylinder. In addition to propelling the ear of corn longitudinally through the cylinder and concave, the angled ridges have a component of motion which is tangential to the ears of corn. The abrasion of the ears by the ridges thus causes each ear to spin about its own longitudinal axis as it moves longitudinally through the combine. This spin component of the double motion imparted to the ears causes adjacent parallel ears to abrade against each other. Since the kernels are abraded by the kernels of adjacent ears, whose hardness is comparable rather than substantially greater than their own, the undesirable cracking of the kernels is greatly reduced.

The double motion imparted to the ears further assures that fewer kernels will remain unshelled on the ears, since a more vigorous abrasion is established, not only with adjacent ears but also with ridges 14 and concave 16. The primary shelling action, however, is created by the abrasion of adjacent ears against each other, with ridges 20 serving mainly to maintain the desired alignment and position of the ears as they proceed through the cylinder and concave. The kernels fall through the perforations in concave 16 and are collected in the usual manner.

The angle by which ridges 14 are skewed from an element of the cylinder must be sufficiently great to impart a substantial spinning motion to the ears.

The spacing between guide ribs 20 is preferably less than the length of an ear of corn, to assure that the desired orientation of the ears will be obtained.

A modified form of cylinder 26 is illustrated in FIG. 4. The circumference of the cylinder consists of six parallel and longitudinally extending segments 28, each having a plurality of straight parallel ridges secured thereon at about a 45° angle to the axis of the cylinder. Segments 28 are arranged so that ridges 30 of adjacent segments alternate in direction, as in a herringbone pattern. The concave for use with this modified cylinder would be the same as described above.

The operation of the combine with modified cylinder 26 differs from that described with relation to FIGS. 1–3 only in that the ears of corn are subjected to a rapidly reversing direction of spin as they travel through the cylinder and concave, thus increasing the vigor of the abrading action. The double motion action, with the resulting shelling of one ear by the adjacent ear, is retained in this embodiment.

In both embodiments, the thoroughness of the shelling is further assured by the increased duration of contact between the ear of corn and the abrading surfaces, each ear contacting ridges 14 or 30, concave floor 18, and at least one adjacent ear. Furthermore, the kernels are abraded from two directions, both longitudinal and tangential.

This invention may be further developed within the scope of the following claims. Accordingly, the above specification is to be interpreted as illustrative of only two operative embodiments of this invention, rather than in a strictly limited sense.

I now claim:

1. In an agricultural combine having a cylinder mounted for rotation about a horizontal axis and a cooperating concave positioned below the cylinder for receiving crops at a forward edge and ejecting them at a rearward edge under the impetus of the cylinder rotation, the improved cylinder and concave especially adapted for shelling corn comprising:

a plurality of parallel, outwardly projecting and elongated ridges spaced at intervals around the periphery of the cylinder and fixed thereto, said ridges being skewed relative to an element of the cylinder;

a plurality of parallel upstanding guide ribs fixed to the upper surface of the concave and extending between the forward and rearward edges thereof in a direction perpendicular to the axis of the cylinder, said guide ribs being spaced from each other a distance sufficient to just accommodate a predetermined plurality of parallel and tangentially contacting ears of corn between each adjacent pair of guide ribs but less than the length of an ear of corn;

the gap between the surface of the concave and the outer edge of the helical ridges being slightly less than the diameter of an unshelled ear of corn;

whereby said guide ribs maintain the ears of corn parallel with each other and with said guide ribs, and whereby said helical ridges impart simultaneous longitudinal translation and axial spin to the ears of corn passing through the cylinder and concave, thereby to induce shelling of the ears by the abrasion of adjacent ears against each other.

2. The combine of claim 1 wherein said cylinder ridges are continuous parallel helixes extending around the cylinder from one end to the other of the cylinder.

3. The combine of claim 1 wherein said cylinder ridges are arranged in a herringbone pattern of alternatingly inclined groups of short, straight and parallel ridges, so that rotation of the cylinder presents a continuously reversing pattern of inclined ridges.